(12) United States Patent
Stachnik et al.

(10) Patent No.: US 11,125,872 B2
(45) Date of Patent: Sep. 21, 2021

(54) METHOD FOR ROBUST ESTIMATION OF THE VELOCITY OF A TARGET USING A HOST VEHICLE

(71) Applicant: Aptiv Technologies Limited, St. Michael (BB)

(72) Inventors: Mateusz Stachnik, Gdow (PL); Krzysztof Kogut, Cracow (PL); Maciej Rozewicz, Dukla (PL)

(73) Assignee: Aptiv Technologies Limited, St. Michael (BB)

( * ) Notice: Subject to any disclaimer, the term of this patent is extended or adjusted under 35 U.S.C. 154(b) by 181 days.

(21) Appl. No.: 16/409,019

(22) Filed: May 10, 2019

(65) Prior Publication Data
US 2019/0369228 A1 Dec. 5, 2019

(30) Foreign Application Priority Data
Jun. 1, 2018 (EP) .................................... 18175505

(51) Int. Cl.
*G01S 13/58* (2006.01)
(52) U.S. Cl.
CPC .......... *G01S 13/588* (2013.01); *G01S 13/584* (2013.01); *G01S 13/589* (2013.01)
(58) Field of Classification Search
CPC ......... G01S 13/588; G01S 2013/93274; G01S 2013/93271; G01S 13/931; G01S 13/589;
(Continued)

(56) References Cited

U.S. PATENT DOCUMENTS 6,202,027 B1 * 3/2001 Alland .................... G01S 17/42
701/301
9,043,132 B2 5/2015 Obi
(Continued)

FOREIGN PATENT DOCUMENTS

CN 103183028 7/2013
CN 104290752 1/2015
(Continued)

OTHER PUBLICATIONS

European Search Opinion on EP18175505.9, dated Nov. 27, 2018 (dated 2018).*
Kellner, et al.: Instantaneous Lateral Velocity Estimation of a Vehicle using Doppler Radar, Institute of Measurement, Control and Microtechnology Germany, Jul. 9-12, 2013, 9 pages.
Kellner, et al.: "Instantaneous Full-Motion Estimation of Arbitrary Objects using Dual Doppler Radar" Institute of Measurement, Control and Microtechnology Germany, Jul. 9-12, 2014, 6 pages.
(Continued)

*Primary Examiner* — Thomas M Hammond, III
(74) *Attorney, Agent, or Firm* — Colby Nipper PLLC (57) ABSTRACT

A method for estimating a velocity of a target using a host vehicle equipped with a radar system includes determining a plurality of radar detection points, determining a compensated range rate, and determining an estimation of a first component of a velocity profile equation of the target and an estimation of a second component of the velocity profile equation of the target by using an iterative methodology comprising at least one iteration. The estimations and of the first and second components and of the velocity profile equation are not determined from a further iteration if at least one statistical measure representing the deviation of an estimated dispersion of the estimations and of the first and second components, and of a current iteration from a previous iteration and/or the deviation of an estimated dispersion of the residual from a predefined dispersion of the range rate meets a threshold condition.

18 Claims, 4 Drawing Sheets

(58) Field of Classification Search
CPC ...... G01S 13/42; G01S 13/584; G01S 7/2955; G01S 2013/932; G01S 7/2921; G01S 13/92
USPC .......................................................... 342/105
See application file for complete search history.

(56) References Cited

U.S. PATENT DOCUMENTS

| | | | |
|---|---|---|---|
| 9,187,091 B2 * | 11/2015 | Mills | ............... B60W 10/18 |
| 9,390,624 B2 | 7/2016 | Minemura et al. | |
| 9,983,301 B2 | 5/2018 | Liu et al. | |
| 10,114,106 B2 | 10/2018 | Schiffmann et al. | |
| 10,634,766 B2 | 4/2020 | Stachnik et al. | |
| 2005/0075788 A1 | 4/2005 | Smith et al. | |
| 2005/0216146 A1 | 9/2005 | Bauer et al. | |
| 2011/0068970 A1 * | 3/2011 | Mitsumoto | ........... G01S 7/4056 342/70 |
| 2011/0122014 A1 | 5/2011 | Szajnowski | |
| 2013/0030686 A1 | 1/2013 | Morotomi et al. | |
| 2015/0054676 A1 * | 2/2015 | Vinski | ................... G08G 1/017 342/51 |
| 2016/0202346 A1 | 7/2016 | Anderson et al. | |
| 2017/0206436 A1 | 7/2017 | Schiffmann | |
| 2017/0363727 A1 | 12/2017 | Prasad et al. | |
| 2017/0363728 A1 | 12/2017 | Prasad et al. | |
| 2018/0024228 A1 | 1/2018 | Schiffmann et al. | |
| 2018/0356498 A1 | 12/2018 | Stachnik et al. | |
| 2018/0356517 A1 | 12/2018 | Cieslar et al. | |
| 2019/0004166 A1 | 1/2019 | Orlowski et al. | |
| 2019/0361106 A1 | 11/2019 | Stachnik et al. | |
| 2019/0361113 A1 * | 11/2019 | Ray | ......................... G01S 7/282 |
| 2020/0057090 A1 | 2/2020 | Stachnik et al. | |
| 2020/0182992 A1 | 6/2020 | Kellner et al. | |

FOREIGN PATENT DOCUMENTS

| | | |
|---|---|---|
| CN | 105842684 | 8/2016 |
| CN | 106372278 | 2/2017 |
| CN | 107209264 | 9/2017 |
| DE | 102013011239 A1 | 1/2015 |
| DE | 102013018310 | 4/2015 |
| DE | 102013019804 | 5/2015 |
| EP | 2307908 | 1/2012 |
| EP | 3285230 | 2/2018 |
| GB | 2504376 | 1/2014 |
| JP | 2015111332 | 6/2015 |
| KR | 20080007780 | 1/2008 |

OTHER PUBLICATIONS

Fischler, et al.: Communications of the ACM, 1981, "Random Sample Consensus: A Paradigm for Model Fitting with Applications to Image Analysis and Automated Cartography", 15 pages.
"Extended European Search Report", EP Application No. 17175548.1, dated Dec. 15, 2017, 9 pages.
"Final Office Action", U.S. Appl. No. 16/004,487, dated Oct. 21, 2020, 7 pages.
"Foreign Office Action", CN Application No. 201810586972.1, dated Nov. 4, 2020, 14 pages.
"Non-Final Office Action", U.S. Appl. No. 16/004,487, dated Mar. 17, 2020, 8 pages.
"Non-Final Office Action", U.S. Appl. No. 16/386,691, dated Apr. 16, 2021, 12 pages.
"Non-Final Office Action", U.S. Appl. No. 16/004,487, dated Feb. 3, 2021, 8 pages.
Brobeit, et al., "Fusion of Doppler Radar and Geometric Attributes for Motion Estimation of Extended Objects", Oct. 2015, 5 pages.
Jung, et al., "Rectangle Detection Based on a Windowed Hough Transform", Jan. 2004, 8 pages.
Jung, et al., "Scanning Laser Radar-Based Target Position Designation for Parking Aid System", Sep. 2008, pp. 406-424, 19 pages.
Kellner, et al., "Tracking of Extended Objects with High Resolution Doppler Radar", Dec. 2015, 13 pages.
Kmiotek, et al., "Representing and Tracking of Dynamics Objects Using Oriented Bounding Box and Extended Kalman Filter", Oct. 2008, pp. 322-328, 7 pages.
Roos, et al., "Estimation of the Orientation of Vehicles in High-Resolution Radar Images", Apr. 2015, 4 pages.
Roos, et al., "Estimation of the Orientation of Vehicles in High-Resolution Radar Images", Apr. 2015, 5 pages.
Roos, et al., "Reliable Orientation Estimation of Vehicles in High-Resolution Radar Images", Jul. 2016, 9 pages.
Toussaint, "Solving Geometric Problems with the Rotating Calipers", May 1983, 8 pages.
"Foreign Office Action", CN Application No. 201810586972.0, dated Jun. 11, 2021, 8 pages.
"Foreign Office Action", EP Application No. 17175548.1, dated Jun. 7, 2021, 6 pages.
"Foreign Office Action", CN Application No. 201910747166.2, dated Jun. 9, 2021, 13 pages.

* cited by examiner

METHOD FOR ROBUST ESTIMATION OF THE VELOCITY OF A TARGET USING A HOST VEHICLE

CROSS-REFERENCE TO RELATED APPLICATION

This application claims the benefit under 35 U.S.C. § 119(a) of European Patent Application EP 18175505.9, filed Jun. 1, 2018, the entire disclosure of which is hereby incorporated herein by reference.

TECHNICAL FIELD OF INVENTION

The invention relates to an on-board vehicle method of robust estimation of the velocity of a target in a horizontal plane using a host vehicle.

BACKGROUND

Vehicles may be equipped with radars systems used to classify the environment in the vicinity of the vehicle such as to, e.g., detect moving or static objects around the vehicle. Such systems are used for example to estimate the motion state of other vehicles for automotive perception systems and can be used in active safety, driver assistance as well as in general automated and autonomous driving applications.

SUMMARY OF THE DISCLOSURE

Due to the perceptive capabilities of the system, in particular to sense another vehicle, vehicles that are equipped with the system are usually denoted as host vehicles. Typically, a radar system includes Doppler radar technology implemented in a radar sensor unit which is adapted to receive signals that are emitted from a host vehicle and reflected by a target. Generally, the captured data comprises radar detection measurements on which basis detection points (or point detections) are determined, wherein a given detection point represents a spatial location. These detection points are assumed to be located on the surface of the target and can be regarded as having x and y coordinates in the horizontal plane (i.e. on a 2-dimensional plan view/map). Alternatively, the location of a detection point may be considered in polar coordinates of (radial) range and azimuth angle. So each location can be described by two components.

For many applications in the area of autonomous driving it is necessary to provide an accurate estimation of the velocity of one or more targets in the vicinity of the host vehicle. The velocity of a given target can be derived from a plurality of detection points which are assumed to be located on the target. This is to say that there are several point detections captured by the Doppler radar from a single target (such target is usually referred to as a distributed/rigid target). Because of using radar, a range rate can readily be determined for each detection point, i.e., the rate of change of the (radial) distance between the sensor unit of the host vehicle and the target at the measurement instance. This range rate can be compensated for the velocity of the host vehicle in order to get an indication of the "velocity of the detection point" which is assumed to be located on the target. However, this indication, which may be denoted as compensated range rate, is usually not an accurate estimate of the velocity of the target due to degrading influence factors such as noise. Furthermore, the range rates of neighbouring detection points of a given cluster can vary which inevitably causes an uncertainty of estimating the velocity from the detection points. In particular, so called wheel-spin detections (i.e., the velocity measured from the wheel speed of the host vehicle does not match with the true speed of the vehicle due to wheel slipping) and clutter (i.e., detection points which are not located on the target) can degrade the accuracy of the estimation. In fact, even when the so-called velocity profile equation is derived from a large number of detection points, the estimation can be heavily degraded due to a small number of noisy detection points (i.e., outliers). Therefore, robust estimation algorithms can be used in order to reduce the effect of noisy detection points. One example of a robust estimation algorithm is the iteratively reweighted least squares algorithm which is known from the art and which implements a so-called M-estimator (cf. R. Maronna, D. Martin, V. Yohai, "Robust Statistics: Theory and Methods", Wiley, 2006).

One problem associated with robust estimation algorithms known from the art and which can be employed for estimating the velocity of a target in the scenario described above is that the quality of the estimation cannot be easily controlled. Furthermore, the estimation is expensive with regard to the usage of computational resources due to the number of required iterations, e.g., of the iteratively reweighted least squares algorithm. A large number of iterations is undesired when the estimation of the velocity needs to be available as fast as possible, i.e., in real-time, which is critical in active safety, driver assistance and autonomous driving applications. On the other side, simply reducing the number of iterations can lead to estimations which are not valid, i.e., the estimations have a large error with respect to ground truth.

The method of claim 1 is a method for robust estimation of the velocity of a target in a horizontal plane using a host vehicle equipped with a radar system, the radar system including a radar sensor unit adapted to receive signals emitted from the host vehicle and reflected by said target in one measurement time instance. The method comprises: a) emitting a radar signal and determining, from a plurality of radar detection measurements captured by said radar sensor unit, a plurality of radar detection points, each radar detection point comprising an azimuth angle $\theta_i$ and a range rate $\dot{r}_i$, wherein the range rate $\dot{r}_i$ represents the rate of change of the distance between the sensor unit and the target; b) determining a compensated range rate $\dot{r}_{i,cmp}$ represented by:

$$\dot{r}_{i,cmp} = \dot{r}_i + u_s \cos\theta_i + v_s \sin\theta_i,$$

wherein $u_s$ represents a first velocity component of the sensor unit and wherein $v_s$ represents a second velocity component of the sensor unit; c) determining, from the results of step a) and b), an estimation $\tilde{c}_t$ of a first component $c_t$ of the velocity profile equation of the target (2) and an estimation $\tilde{s}_t$ of a second component $s_t$ of the velocity profile equation of the target (2) by using an iteratively reweighted least squares methodology comprising at least one iteration and applying weights $w_i$ to the radar detection points, wherein the velocity profile equation of the target (2) is represented by:

$$\dot{r}_{i,cmp} = c_t \cos\theta_i + s_t \sin\theta_i;$$

d) determining an estimation $\hat{\dot{r}}_{i,cmp}$ of the velocity profile equation represented by:

$$\hat{\dot{r}}_{i,cmp} = \tilde{c}_t \cos\theta_i + \tilde{s}_t \sin\theta_i,$$

wherein the azimuth angle $\theta_i$ is determined from step a) and the estimations $\tilde{c}_t$ and $\tilde{s}_t$ of the first and second components $c_t$ and $s_t$ of the velocity profile equation are determined from step c); e) determining a residual $e_{\dot{r},i}$ of the estimation $\hat{\dot{r}}_{i,cmp}$ of the velocity profile equation determined from step d) and the compensated range rate $\dot{r}_{i,cmp}$ determined from step b), wherein the residual $e_{\dot{r},i}$ is represented by the difference of the compensated range rate $\dot{r}_{i,cmp}$ and the estimation $\hat{\dot{r}}_{i,cmp}$ of the velocity profile equation, and further determining the weights $w_i$ with respect to the residual $e_{\dot{r},i}$; f) determining an estimation of the velocity of the target (2) on the basis of the estimations $\tilde{c}_t$ and $\tilde{s}_t$ of the first and second components $c_t$ and $s_t$ of the velocity profile equation determined from step c), and wherein, in step c), the estimations $\tilde{c}_t$ and $\tilde{s}_t$ of the first and second components $c_t$ and $s_t$ of the velocity profile equation of the target (2) are not determined from a further iteration of the iteratively reweighted least squares methodology if at least one statistical measure representing the deviation of an estimated dispersion of the estimations $\tilde{c}_t$ and $\tilde{s}_t$ of the first and second components $c_t$ and $s_t$ of a current iteration from a previous iteration and/or the deviation of an estimated dispersion of the residual $e_{\dot{r},i}$ from a predefined dispersion of the range rate $\dot{r}_i$ meets a threshold condition.

It is understood that in connection with the mathematical expressions the term "represent" is used herein in a broad sense which means that the representing expression does not necessarily need to be exactly fulfilled. In particular, an algebraic expression is to be understood in a conceptual sense. This is to say that an equal sign can still be satisfied if the equality is only approximately fulfilled. Therefore, if the expression is implemented on a computer machine any numerical deviations from the narrow meaning of the expression (i.e., offsets or essentially constant factors) which are merely due to technical details of the implementation do not influence the fact that the implementation falls under the meaning of the expression, as is understood by those skilled in the art.

The steps of the method are carried out for at least one of the plurality of detection points, preferably for all detection points of the plurality of detection points. This is to say that each step can be carried out for all detection points with the index i=1, 2, . . . n, where n denoted the number of detection points.

One finding of the invention is that the decision about a further iteration within the framework of the iteratively reweighted least squares methodology (IRLS) is critical with regard to the quality of the estimation of the required coefficients. The decision also has an impact on the computational complexity of the estimation. In other words, the invention provides a solution in which the number of iterations is better controlled in order to efficiently arrive at a good estimation result. The invention proposes to make the decision of further iterations on the basis of one or more statistical measures. These measures are based on specific information that is derived in connection with a current and/or previous iteration. Each of these statistical measures can be compared to at least one predetermined threshold. For example if the comparison meets a predefined condition, e.g. the measure under test is greater than a threshold, then no further iteration may be carried out. This approach can be denoted as a plausibility and/or convergence check of a current estimation (i.e., solution of the IRLS algorithm/methodology).

A plausibility check can be formed by an assessment of a current estimation with respect to a binary outcome, i.e. the estimation is plausible or not. If for example the current estimation is not plausible it is preferably not treated as a final solution and is therefore not used for further purposes, e.g. within an autonomous driving application or for a subsequent iteration of the IRLS methodology. Instead, an estimation from a previous iteration may be used.

A convergence check can be formed by an assessment of a current estimation with respect to a binary outcome, i.e. the estimation is converging or not. Converging is to be understood in the sense of iteration algorithms, wherein the stability or quality of a current solution needs to be assessed in order to decide whether a further iteration should be carried out.

Both types of checks (plausibility and convergence check) can be used separately or in combination. For each check one or more of the statistical measures disclosed herein can be compared to a respective threshold, i.e. each measure is associated with an individual threshold. Preferably, more than one statistical measure is employed in combination, wherein each of the measures needs to fulfil a respective threshold condition in order to stop the IRLS methodology, i.e. not carrying out a further iteration. In this way, iterations which do not lead to a better solution are avoided, thus arriving at the best possible solution with a lower number of iterations.

It is understood that the statistical measures as well as the threshold condition can be formulated reciprocally. This means that the same criterion for deciding whether or not a further iteration is carried out can easily be expressed in different ways, as the skilled person understands. For example, the threshold condition can be formulated negatively, i.e. a further iteration is not carried out when the condition is met. In turn, a positive formulation would mean that a further iteration is carried out when the condition is met. The same statistical measure can be used in both cases, but as reciprocal in one of the cases. In this way, the same criterion can be effectively applied in form of two mathematically different variants. For the same reason, a threshold condition can either be that the measure under test needs to be higher or lower than the threshold. Another possibility of a threshold condition is that the measure under test is higher than a first threshold and lower than a second threshold, wherein this second threshold is higher than the first threshold.

A statistical measure is to be understood as a numerical value with a specific statistical meaning. Measures known from the art, e.g., simple statistical measures like (arithmetic) mean, standard deviation, or variance may be employed as statistical measures. Instead of standard deviation and variance, other types of dispersion measures may also be employed.

The term dispersion is preferably understood to represent a standard deviation in the sense of statistics. This may also cover derived figures which effectively represent the same information. For example dispersion could also be the variance in a statistical sense, which is commonly defined as the square of the standard deviation. The attribute "estimated" in connection with dispersion expresses the circumstance that the dispersion is estimated within the framework of the method and is not predefined. This is to say that each estimated dispersion is determined within the method and representing a statistical estimation of the unknown true value. In contrast the predefined dispersion of the range rate can be predetermined by the used radar sensor system.

A velocity of an object is preferably expressed with respect to an arbitrary coordinate system and usually comprises two components, preferably Cartesian components in orthogonal relation to each other. However, in principle it would also be possible to employ other representations. In connection with the first and second velocity components of step b) in claim 1, these components can be equal to a longitudinal and a lateral velocity component, respectively. This would be equivalent to Cartesian components.

Similarly, the first and second components of the velocity profile equation can be Cartesian components. However, in case of a nonzero yawing rate of host vehicle the first and second components are more complex and not limited to longitudinal and lateral components of a Cartesian coordinate system.

The term IRLS methodology refers to an implementation of a so-called M-estimator mentioned above, which is a form of robust regression. It is useful for robust regression estimation since potential outliers are weighted in such a way that they do not affect the estimation result at all or at least not as strongly as in ordinary least squares (OLS) regression. This usually leads to an estimation with increased validity. According to the invention, one or more of the statistical measures mentioned in claim 1 are combined with the IRLS methodology. This has been found to lead to more accurate estimations at a lower computational effort. Each of the statistical measures is capable to achieve this alone, however, the measures can also be used in combination, as will become apparent in the following. Therefore, this disclosure refers to any combination of the measures including those mentioned in the dependent claims and further below.

With regard to step e) of the method the residual may be represented by:

$$e_{r,i} = \dot{r}_{i,cmp} - \hat{\dot{r}}_{i,cmp},$$

wherein other representations are possible, e.g., magnitude of the above expression or with sign inversion. The weights can be determined using a nonlinear threshold function known from the art, e.g., signum function, Huber function or Bisquare function. Preferably, the signum function is used:

$$w_i = \begin{cases} 1, & \text{for } |e_{r,i}| \le K \\ 0, & \text{for } |e_{r,i}| > K \end{cases}$$

with a threshold K. The residual $e_{r,i}$ is determined for at least some of the detection points, preferably for all detection points on which the IRLS methodology is based. Also preferably, a weight is determined for each residual which is then used in the IRLS methodology of step c).

As indicated above, steps b), d) and e) of the method are carried out for at least some of the detection points, preferably for all detection points on which the IRLS methodology is based and which thus serve for estimating the velocity of the vehicle. It is understood that the terms "deviation" and "difference" can refer to a simple subtraction but also to other mathematical figures which represent the difference as well, e.g., a ratio. Advantageous embodiments of the method are disclosed in the dependent claims, the description and the figures.

It is possible to include further conditions for deciding about a further iteration. For example, in step c), the estimations $\tilde{c}_t$ and $\tilde{s}_t$ of the first and second components $c_t$ and $s_t$ of the velocity profile equation of the target are also not determined from a further iteration of the iteratively reweighted least squares methodology if at least one statistical measure representing the linear dependency of the detection points meets a threshold condition. In a preferred embodiment the statistical measure representing the linear dependency of the detection points is based on the determinant of $$X^T W X$$

with $$X = \begin{bmatrix} \cos\theta_1 & \sin\theta_1 \\ \vdots & \vdots \\ \cos\theta_n & \sin\theta_n \end{bmatrix}$$

and W representing the weights $w_i$ arranged in a diagonal matrix. If the determinant of the matrix $X^T W X$ is beyond a positive threshold, the matrix can be assumed to have full rank, i.e., the individual detection points are not linearly dependent and the matrix can be inverted leading to a stable, i.e., valid solution. Therefore, if this threshold condition is fulfilled and applied no further iteration is carried out.

In another embodiment, in step c), the estimations $\tilde{c}_t$ and $\tilde{s}_t$ of the first and second components $c_t$ and $s_t$ of the velocity profile equation of the target (2) are also not determined from a further iteration of the iteratively reweighted least squares methodology if at least one statistical measure representing the weights $w_i$ applied to the detection points meets a threshold condition. For example the statistical measure representing the weights $w_i$ can be based on the mean of the weights $w_i$ or it can be equal to the mean, for example the arithmetic mean. The weights contain useful information about the nature of the current estimation. If for example the mean of the weights is above a threshold this can be an indication that the current solution is a good one (i.e., robust) and that no further iteration is necessary. The mean may also be directly chosen as the statistical measure. Not all weights in the matrix W need to be considered although this is possible. Applying the weights to the detection points may be carried out by the matrix multiplication $$X^T W X.$$

According to another preferred embodiment the estimated dispersion of the residual $e_{r,i}$ is represented by the square root of:

$$\hat{\sigma}_r^2 = \frac{\sum_{i=1}^n (\psi(e_{r,i}))^2}{\left(\sum_{i=1}^n \psi(e_{r,i})'\right)^2 (n-2)}$$

with $$\psi(e_{r,i}) = w_i e_{r,i},$$

wherein $\psi(e_{r,i})'$ represents the first derivative of $\omega(e_{r,i})$ with respect to the residual $e_{r,i}$, and wherein n represent the number of detection points. The advantage of determining the dispersion in this way is that it is sufficiently accurate for representing the dispersion while requiring only low computational effort. As indicated further above the dispersion can also be the variance, i.e. the dispersion of the residual $e_{r,i}$ maybe represented by $\hat{\sigma}_r^2$ or other measures which reflect the same information.

According to a further embodiment the estimated dispersion of the estimations $\tilde{c}_t$ and $\tilde{s}_t$ of the velocity profile equation is represented by the sum of the individual estimated dispersions of the estimations $\tilde{c}_t$ and $\tilde{s}_t$ of the velocity profile equation. The individual dispersions can be determined as the autocovariance coefficients, respectively, as is known from the art.

The method can further comprise a step of determining the estimated dispersion of the estimations $\tilde{c}_t$ and $\tilde{s}_t$ of the first and second components $c_t$ and $s_t$ of the velocity profile equation can be represented by the trace evaluated on the basis of:

$$\hat{\sigma}_{VP}^2 = \hat{\sigma}_r^2 (X^T W X)^{-1} = \begin{bmatrix} \hat{\sigma}_{cc}^2 & \hat{\sigma}_{cs}^2 \\ \hat{\sigma}_{sc}^2 & \hat{\sigma}_{ss}^2 \end{bmatrix},$$

with $$X = \begin{bmatrix} \cos\theta_1 & \sin\theta_1 \\ \vdots & \vdots \\ \cos\theta_n & \sin\theta_n \end{bmatrix},$$

W representing the weights $w_i$ arranged in a diagonal matrix, and $$\hat{\sigma}_{cc}^2, \hat{\sigma}_{ss}^2, \hat{\sigma}_{cs}^2, \hat{\sigma}_{sc}^2$$

representing estimated dispersion coefficients, wherein $$\hat{\sigma}_r^2$$

represents the square of the estimated dispersion of the residual $$e_{r,i}.$$

Preferably, the matrix X comprises the cosines of the azimuth angles of the individual detection points arranged in the first row and the corresponding sines in the second row, as illustrated above. The square of the dispersion of the residual $e_{r,i}$, $\hat{\sigma}_r^2$, maybe determined as described further above.

The matrix $\hat{\sigma}_{VP}^2$ recited above can be denoted as the estimated dispersion of the estimation $\hat{r}_{i,cmp}$ of the velocity profile equation. As stated above the dispersion of the estimations $\tilde{c}_t$ and $\hat{s}_t$ can be determined by evaluating the trace on the basis of $\hat{\sigma}_{VP}^2$, e.g., $\mathrm{tr}(\hat{\sigma}_{VP}^2)$. The expression "on the basis of" also covers the possibility of a preprocessing, for example taking the square root before evaluating the trace, i.e. $\mathrm{tr}(\hat{\sigma}_{VP}) = \hat{\sigma}_{cc} + \hat{\sigma}_{ss}$. The trace is defined as the sum of the diagonal entries of a matrix. Mathematically, it can be shown that the trace of the square root of the estimated dispersion of the estimation $\hat{r}_{i,cmp}$ of the velocity profile equation is equivalent to the sum of the autocovariances of the individual estimations, i.e., $\mathrm{tr}(\hat{\sigma}_{VP}) = \hat{\sigma}_{cc} + \hat{\sigma}_{ss}$. However, determining autocovariances is usually computationally more expensive than determining the trace of a matrix. In particular, the matrix $\hat{\sigma}_{VP}$ is preferably used multiple times, thus providing a synergistic effect which leads to an increased efficiency of the method.

According to another embodiment the predefined dispersion of the range rate $\dot{r}_i$ is given by a specification of the radar sensor unit. The predefined dispersion can therefore be interpreted as the accuracy or uncertainty of the radar sensor. This predefined dispersion can simply be stored and does not need to be determined when carrying out the method.

The method can further comprise a step of marking detection points to which weights above a threshold have been applied. A high weight is an indication of an outlier which can be caused for example by wheel slip or by clutter. In some cases it is useful to discriminate between those two groups. Outliers due to wheel spins are useful for, e.g., position estimation. Outliers due to clutter should be excluded from further processing. Therefore, the detected outliers can be used as an input for a wheel spin clutter classification algorithm. The output of the algorithm can then be used to select detection points on which basis the position and/or the dimensions of the target can be estimated with greater accuracy. Further information about the benefits of detected wheel spins can be found in: D. Kellner, M. Barjenbruch, J. Klappstein, and J. Dickmann, K. Dietmayer, "Wheel Extraction based on Micro Doppler Distribution using High-Resolution Radar," in IEEE MTT-S International Conference on Microwaves for Intelligent Mobility, Istanbul, Germany, 2015.

The invention further relates to a computer-readable storage device with software for the method of one of the preceding embodiments. The invention also relates to a vehicle with a computer-readable storage device with software for carrying out the method of one of the preceding embodiments, and a control unit, wherein the control unit of the vehicle is configured to receive an estimation of the velocity of the target determined by means of the method, wherein the control unit of the vehicle is further configured to control the vehicle with respect to the estimation of the velocity of the target and/or to output a warning signal if the estimation of the velocity meets a threshold condition.

Having regard to the IRLS methodology, it can be initialized with a simple OLS solution followed by determining the weights on the basis of the residuals as described above. The coefficients may then be estimated using:

$$\begin{bmatrix} \tilde{c}_t \\ \tilde{s}_t \end{bmatrix} = [X^T W X]^{-1} X^T W \dot{r}_{cmp},$$

wherein $\dot{r}_{cmp}$ represents the vector of compensated range rates $\dot{r}_{i,cmp}$ for i=1, 2, ... n. On the basis of this solution, one or more of the statistical measures can be determined and checked with respect to at least one threshold condition. If the threshold condition is met, the coefficients are not re-estimated within the scope of a further iteration comprising a new weighting based on the residuals. This means that for example either the current solution or a previous solution is provided as the final solution of the method.

One advantage of the invention is that the statistical measures proposed are easy to interpret. The corresponding thresholds for controlling the number of iterations can thus be tuned efficiently for a specific application.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Generally, a host vehicle 4 (see FIG. 2) is equipped with a radar system 5' (see FIG. 3) where reflected radar signals from a target 2 (FIG. 1) in the field of view of the radar system 5' are processed to provide data in order to ascertain the parameters used in the methodology. In order to do this various conditions and requirements are required. The target 2 (rigid body, e.g. vehicle) needs to be an extended target, i.e., the target allows the determination of a plurality of points of reflection 6' (see FIG. 4) that are reflected from the target 2 in real-time and that are based on raw radar detection measurements. So, as used herein, the term "extended target" is used to refer to targets 2 that are capable of providing multiple, i.e. two, three or more spaced-apart scattering-points 6' also known as points of reflection 6'. The term "extended target" is thus understood as a target 2 that has some physical size. In this instance it should be noted that the physical size can be selected e.g. in the range of 0.3 m to 20 m in order to be able to detect points of reflection 6' stemming from e.g., a moving person to a moving heavy goods vehicle or the like.

The various scattering points 6' are not necessarily individually tracked from one radar scan to the next and the number of scattering points 6' can be a different between scans. Furthermore, the locations of the scattering points 6' can be different on the extended target 2 in successive radar scans. Radar points of reflection 6' can be determined by the host vehicle 4 from radar signals reflected from the target 2, wherein a comparison of a given reflected signal with an associated emitted radar signal can be carried out to determine the position of the radar point of reflection 6', e.g., in Cartesian or Polar coordinates (azimuth angle, radial range) with respect to the position of a radar-emitting and/or radar-receiving element/unit on the host vehicle, which can be the position of the radar sensor unit.

Figure 1:
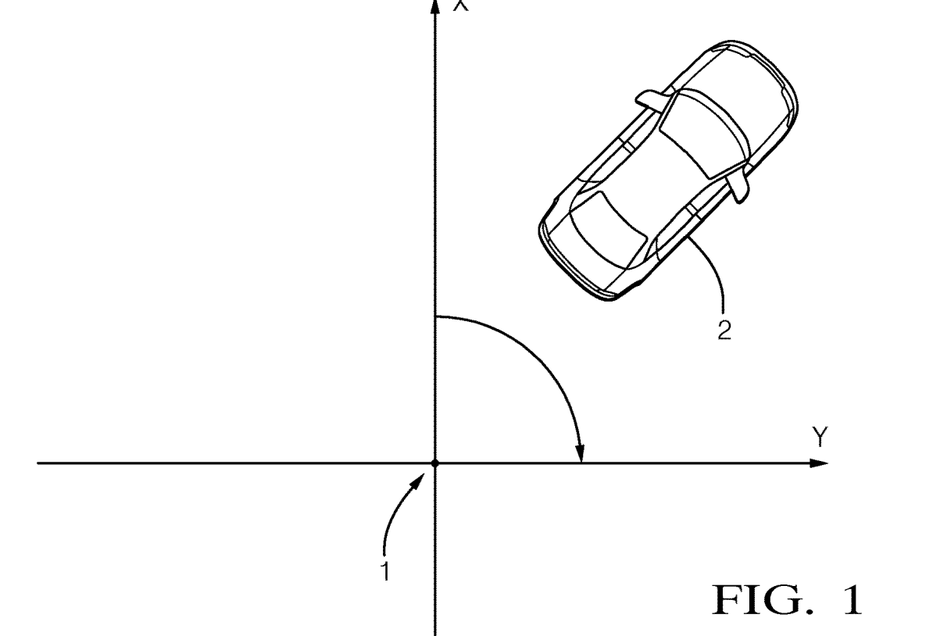
FIG. 1 shows a target coordinate system.

By using, e.g., Doppler radar techniques, the range rate is also determined as known in the art. It is to be noted that the "raw data" from a single radar scan can provide the parameters $\theta_i$ (azimuth angle) and $\dot{r}_i$ (raw range rate, i.e., radial velocity) for the i-th point of reflection of n points of reflection. These are the parameters which are used to estimate the velocity of a (moving) target, wherein i=1, ..., n. It is also to be noted that the term instantaneous radar scan, single radar scan or single measurement instance can include reflection data from a "chirp" in Doppler techniques, which may scan over, e.g., up to 2 ms. In the subsequent description, the following conventions and definitions are used:

World coordinate system: As a convention, a world coordinate system with the origin fixed to a point in space is used—it is assumed that this world coordinate system does not move and does not rotate. Conventionally, the coordinate system is right-handed; the Y-axis, orthogonal to the X-axis, pointing to the right; the Z-axis pointing into the page and a an azimuth angle is defined in negative direction (clockwise) with respect to the X-axis; see FIG. 1 which shows such a coordinate system with origin 1 and a non-ego vehicle 2. FIG. 1 further shows the extended target 2 in the form of a vehicle, e.g. an object having a length of approximately 4.5 m.

Figure 2:
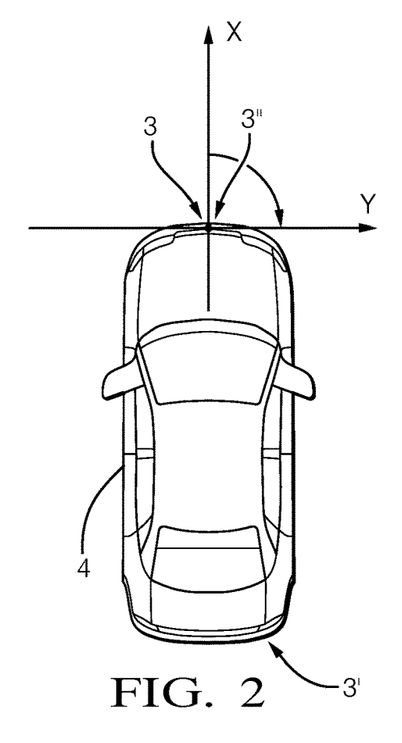
FIG. 2 shows a vehicle coordinate system.

Vehicle coordinate system: FIG. 2 shows a vehicle coordinate system that in the present instance has its origin 3" located at the center of the front bumper 3 of a host vehicle 4. It should be noted in this connection that the origin 3" of the vehicle coordinate system can be arranged at different positions at the host vehicle 4. In the present instance the X-axis is parallel to the longitudinal axis of the vehicle 4, i.e. it extends between the front bumper 3 and a rear bumper 3' and intersects with the center of the front bumper 3 if the origin 3" is located there. The vehicle coordinate system is right-handed with the Y-axis orthogonal to the X-axis and pointing to the right, the Z-axis pointing into the page. An (azimuth) angle is defined as in the world coordinate system.

Figure 3:
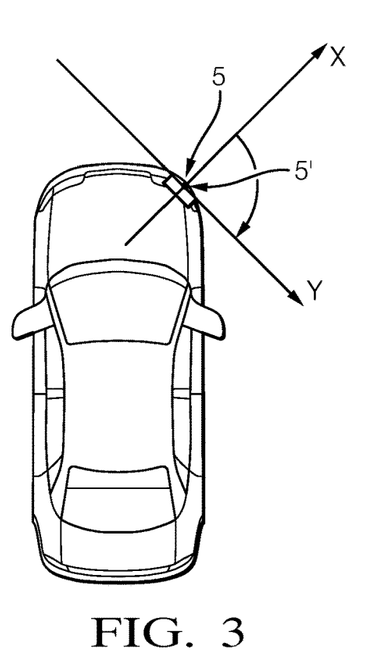
FIG. 3 shows a sensor coordinate system.

Sensor coordinate system: FIG. 3 shows a sensor coordinate system having the origin 5. In the example of FIG. 3 the origin 5 is located at the center of a sensor unit 5', which can be a radome. The X-axis is perpendicular to the sensor radome, pointing away from the radome. The coordinate system is right-handed: Y-axis orthogonal to the X-axis and pointing to the right; Z-axis pointing into the page. An (azimuth) angle is defined as in the world coordinate system. The velocity and the yaw rate of the host vehicle 4 are assumed to be known from sensor measurements known in the art. The over-the-ground (OTG) velocity vector of the host vehicle 4 is defined as:

$$V_h = [u_h v_h]^T,$$

where $u_h$ is the longitudinal velocity of the host vehicle 4 (i.e., the velocity in a direction parallel to the X-axis of the vehicle coordinate system) and $v_h$ is lateral velocity of the host vehicle 4 (i.e., the velocity in a direction parallel to the Y-axis of the vehicle coordinate system). In more general terms the longitudinal velocity and the lateral velocity are a first and a second velocity component of the host vehicle 4, respectively.

The sensor mounting position and boresight angle with respect to the vehicle coordinate system are assumed to be known with respect to the vehicle coordinate system (VCS), wherein the following notations are used:

$x_{s,VCS}$—sensor mounting position with respect to longitudinal (X-) coordinate $y_{s,VCS}$—sensor mounting position with respect to lateral (Y) coordinate $\gamma_{s,VCS}$—sensor boresight angle.

The sensor over-the-ground (OTG) velocities can be determined from the known host vehicle velocity and the known sensor mounting position. It is understood that more than one sensor can be integrated into one vehicle and specified accordingly. The sensor OTG velocity vector is defined as:

$$V_s = [u_s v_s]^T,$$

wherein $u_s$ is the sensor longitudinal velocity and $v_s$ is the sensor lateral velocity corresponding generally to first and second velocity components in the case of a yaw rate of zero.

At each radar measurement instance (scan) the radar sensor unit captures n (raw) detection points from the target. Each detection point i=1, ..., n can be described by the following parameters expressed in the sensor coordinate system:

$r_i$—range (or radial distance), $\theta_i$—azimuth angle, $\dot{r}_i$—raw range rate (or radial velocity).

Target planar motion can be described by the target OTG velocity vector at the location of each raw detection:

$$V_{t,i} = [u_{t,i} v_{t,i}]^T,$$

wherein $u_{t,i}$ represents the longitudinal velocity of the target at the location of the i-th detection point and $v_{t,i}$ represents the lateral velocity of the target at the location of the i-th detection point, both preferably but not necessarily with respect to the sensor coordinate system. Target planar motion can be described as well by:

$$V_{t,COR} = [\omega_t x_{t,COR} y_{t,COR}]^T,$$

wherein $\omega_t$ represents the yaw rate of the target, $x_{t,COR}$ the longitudinal coordinate of the center of target's rotation, and $y_{t,COR}$ the lateral coordinate of the center of target's rotation. The longitudinal and lateral coordinates or components may also be denoted as first and second coordinates or components. These are preferably but not necessarily in orthogonal relation to each other.

Figure 4:
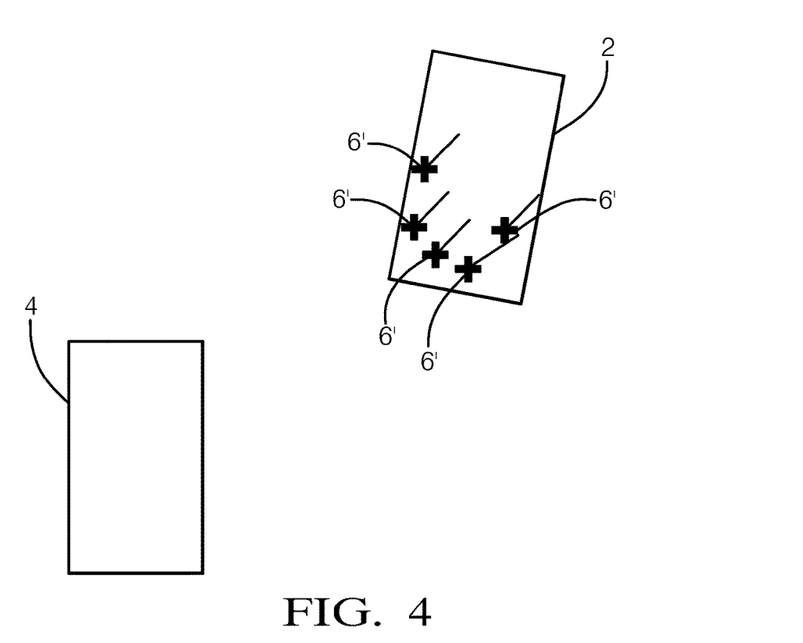
FIG. 4 shows a target vehicle with respect to a host vehicle with detection points located on the target vehicle.

FIG. 4 illustrates target velocity vectors as lines originating from a plurality of detection points 6' illustrated as crosses, wherein the detection points 6' are all located on the same rigid body target 2 and wherein the detection points 6' are acquired using a sensor unit of a host vehicle 4.

Figure 5:
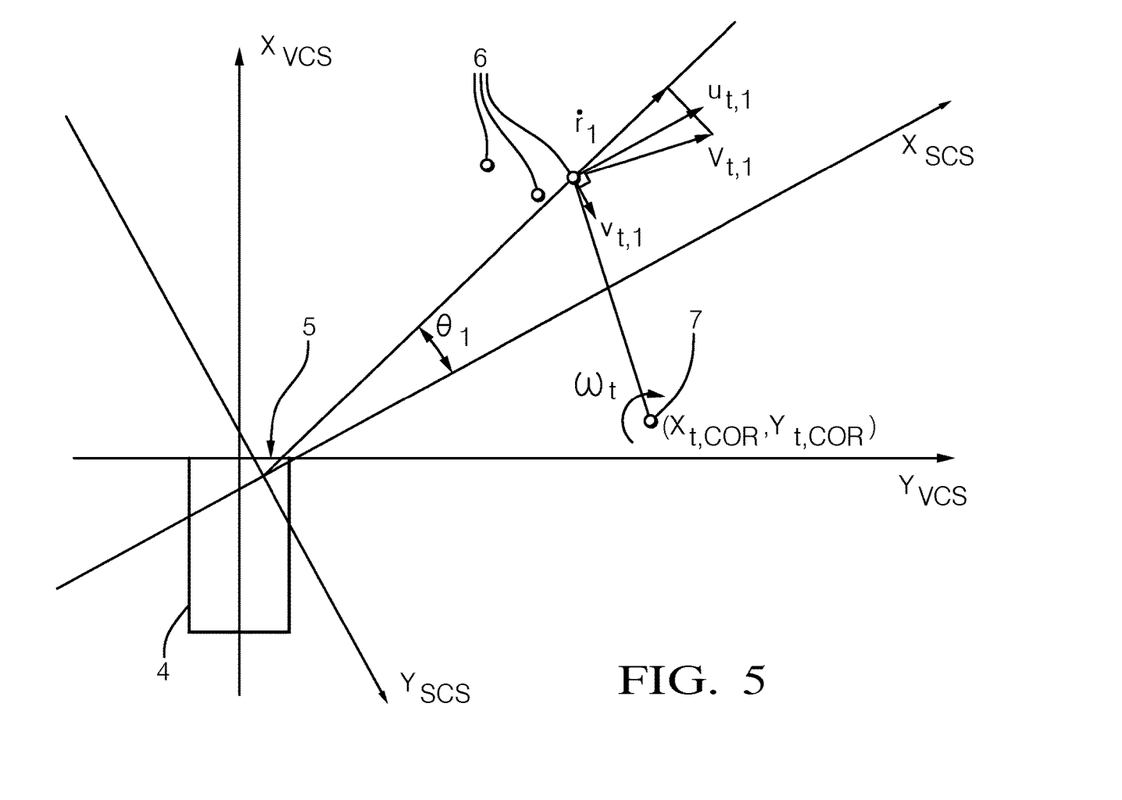
FIG. 5 illustrates how to calculate velocity vectors at the location of a detection point.

The general situation is shown in greater detail in FIG. 5 showing three detection points 6 located on a target (not shown) with a center of rotation 7. The vehicle coordinate system with axes $X_{VCS}$, $Y_{VCS}$ is shown in overlay with the sensor coordinate system having axes $X_{SCS}$, $Y_{SCS}$. The velocity vector of one of the detection points 6 (i=1) is shown together with its components $u_{t,i}$, $v_{t,i}$. The range rate equation for a single detection point can be expressed as follows:

$$\dot{r}_i + u_s \cos\theta_i + v_s \sin\theta_i = u_{t,i} \cos\theta_i + v_{t,i} \sin\theta_i,$$

wherein $\dot{r}_i$ represents the range rate, i.e., the rate of change of the distance between the origin of the sensor coordinate system and a detection point 6, as illustrated in FIG. 5. The location of the detection point 6 can be described by the azimuth angle $\theta_{i=1}$ and the value of the radial distance $r_{i=1}$ (range of detection point, i.e. distance between origin and the detection point).

To simplify the notation the compensated range rate can be defined as:

$$\dot{r}_{i,cmp} = \dot{r}_i + u_s \cos\theta_i + v_s \sin\theta_i$$

with $\dot{r}_{i,cmp}$ representing the range rate of the i-th detection point compensated for the velocity of the host vehicle 4.

The compensated range rate can also be expressed as:

$$\dot{r}_{i,cmp} = u_{t,i} \cos\theta_i + v_{t,i} \sin\theta_i.$$

The compensated range rate can also be expressed in vector notation as:

$$\dot{r}_{i,cmp} = [\cos\theta_i \quad \sin\theta_i] \begin{bmatrix} u_{t,i} \\ v_{t,i} \end{bmatrix}.$$

The so called velocity profile equation (or range rate equation) is defined as:

$$\dot{r}_{i,cmp} = c_t \cos\theta_i + s_t \sin\theta_i,$$

wherein $c_t$ represents the first, e.g. longitudinal, coefficient or component of the range rate and $s_t$ represents the second, e.g. lateral, coefficient or component of the range rate equation. Note that the coefficients $c_t$, $s_t$ are preferably invariant with respect to the azimuth angle at least for a range of azimuth angles corresponding to the location of the target to which a plurality of detection points refer to and on which basis the coefficients have been determined. This means that the velocity profile equation is assumed to be valid not only for specific detection points but for a range of azimuth angles. Therefore, the range rate can readily be determined for any azimuth angle from a specific angle range using the range rate equation.

As the skilled person understands, in practice, the "true" coefficients $c_t$, $s_t$ is usually estimated from a plurality of detection points. These estimates are denoted $\tilde{c}_t$ and $\tilde{s}_t$ and are estimated using an iteratively (re-) weighted least squares methodology.

In the following, a preferred version of the method is described.

Step 1:

In an initial step the method comprises emitting a radar signal and determining, from a plurality of radar detection measurements captured by said radar sensor unit, a plurality of radar detection points at one measurement instance. Each radar detection point comprises at least an azimuth angle $\theta_i$ and a range rate $\dot{r}_i$, wherein the range rate $\dot{r}_i$ represents the rate of change of the distance between the sensor unit and the target at the location of the i-the detection point (cf. FIG. 4). It is understood that the azimuth angle $\theta_i$ describes the angular position of the i-th detection point. It is assumed that the plurality of detection points are located on a single target (such target is usually referred to as a distributed target) as shown in FIG. 4.

Step 2:

The compensated range rate $\dot{r}_{i,cmp}$ is determined as:

$$\dot{r}_{i,cmp} = \dot{r}_i + u_s \cos\theta_i + v_s \sin\theta_i,$$

wherein $u_s$ represents the first (e.g. longitudinal) velocity component of the sensor unit and wherein $v_s$ represents the second (e.g. lateral) velocity component of the sensor unit. The compensated range rate is the range rate compensated for the velocity of the host vehicle. Therefore, the compensated range rate can be interpreted as the effective velocity of the target at the location of the i-th detection point.

Step 3:

From the results of steps 1 and 2, an estimation $\tilde{c}_t$ of the first component $c_t$ of the velocity profile equation of the target and an estimation $\tilde{s}_t$ of the second component $s_t$ of the velocity profile equation of the target are determined by using an iteratively reweighted least squares (IRLS) methodology comprising at least one iteration and applying weights $w_i$ to the radar detection points, wherein the velocity profile equation of the target is represented by:

$$\dot{r}_{i,cmp} = c_t \cos\theta_i + s_t \sin\theta_i.$$

The IRLS methodology is initialized, e.g., by the ordinary least squares (OLS) solution. This is done by first computing:

$$\begin{bmatrix} \tilde{c}_t \\ \tilde{s}_t \end{bmatrix} = [X^T X]^{-1} X^T W \dot{r}_{cmp},$$

wherein $\dot{r}_{cmp}$ represents the vector of compensated range rates $\dot{r}_{i,cmp}$ for i=1, 2 ... n. Using $$\hat{\dot{r}}_{i,cmp} = \tilde{c}_t \cos\theta_i + \tilde{s}_t \sin\theta_i$$

an initial solution for $\hat{\dot{r}}_{i,cmp}$ is computed. Then, the initial residual is $$e_{\dot{r},i} = \dot{r}_{i,cmp} - r_{i,cmp}$$

is computed.

The variance of the residual is then computed as:

$$\hat{\sigma}_{\dot{r}}^2 = \frac{\sum_{i=1}^{n}(e_{\dot{r},i})^2}{n-2}.$$

Next, an estimation of the variance of the estimations $\tilde{c}_t$ and $\tilde{s}_t$ is computed:

$$\hat{\sigma}_{VP}^2 = \hat{\sigma}_{\dot{r}}^2 (X^T X)^{-1},$$

wherein $$X = \begin{bmatrix} \cos\theta_1 & \sin\theta_1 \\ \vdots & \vdots \\ \cos\theta_n & \sin\theta_n \end{bmatrix}.$$

Furthermore, the trace $tr(\hat{\sigma}_{VP})$ is computed. With the initial solution, weights $w_i \in [0; 1]$ are computed as:

$$w_i = \begin{cases} 1, & \text{for } |e_{\dot{r},i}| \leq K \\ 0, & \text{for } |e_{\dot{r},i}| > K \end{cases}$$

wherein $$K = K_\sigma \min(k_1 \hat{\sigma}_{\dot{r}}, \sigma_{\dot{r}}).$$

$K_\sigma$ represents a calibration parameter, $\sigma_{\dot{r}}$ represents the predefined accuracy of the range rate measurement and $k_1$ represents a further calibration parameter, and min( ) is the minimum function which gives the minimum of the arguments. The weights $w_i$ are then arranged in a diagonal matrix W and the estimation of the coefficients of the first iteration is given as:

$$\begin{bmatrix} \tilde{c}_t \\ \tilde{s}_t \end{bmatrix} = [X^T W X]^{-1} X^T W \dot{r}_{cmp}.$$

Step 4:

From the solution of the first iteration an estimation $\hat{\dot{r}}_{i,cmp}$ of the velocity profile is determined represented by:

$$\hat{\dot{r}}_{i,cmp} = \tilde{c}_t \cos\theta_i + \tilde{s}_t \sin\theta_i,$$

wherein the azimuth angle $\theta_i$ is determined from step 1 and the estimation of the first and second components $\tilde{c}_t$ and $\tilde{s}_t$ is determined from step 3 (initial solution). A new residual is computed as:

$$e_{\dot{r},i} = \dot{r}_{i,cmp} - \hat{\dot{r}}_{i,cmp}.$$

The variance of the new residual is then computed as:

$$\hat{\sigma}_{\dot{r}}^2 = \frac{\sum_{i=1}^{n}(\psi(e_{\dot{r},i}))^2}{\left(\sum_{i=1}^{n}\psi(e_{\dot{r},i})'\right)^2 (n-2)}$$

with $$\psi(e_{\dot{r},i}) = w_i e_{\dot{r},i},$$

wherein $(e_{\dot{r},i})'$ represents the first derivative of $\psi(e_{\dot{r},i})$ with respect to the residual $e_{\dot{r},i}$, and wherein n represent the number of detection points.

Next, an estimation of the variance of the estimations $\tilde{c}_t$ and $\tilde{s}_t$ is computed as:

$$\hat{\sigma}_{VP}^2 = \hat{\sigma}_{\dot{r}}^2 (X^T X)^{-1},$$

followed by computing the trace of the square root, i.e. $tr(\hat{\sigma}_{VP})$.

Step 5:

A plausibility check is carried out. In the check it is determined whether each of three statistical measures meets a respective threshold condition according to:

Ap. $\det(X^T W X) > K_{det}$

Bp. $\dfrac{tr(\hat{\sigma}_{VP,j-1}) - tr(\hat{\sigma}_{VP,j})}{tr(\hat{\sigma}_{VP,j-1})} > K_{tr\_plaus}$ Cp. $\mu(\text{diag}(W)) > K_\mu$ wherein j represents the iteration index, $K_{det}$ represents a threshold, $K_{tr\_plaus}$ represents a threshold, $\mu(\text{diag}(W))$ represents the mean of diagonal entries of the matrix W, $K_\mu$ represents a threshold.

If all three conditions Ap, Bp and Cp are fulfilled, the current estimation is considered to be plausible and a convergence check is carried out next. If at least one of the three conditions Ap, Bp and Cp is not fulfilled, the current estimation is considered to be not plausible. In this case the previous estimation is used as a final solution. It is understood that the conditions Ap, Bp and Cp can simply be changed to its respective opposites, that is Ap' $\det(X^T W X) < K_{det}$ Bp' $\dfrac{tr(\hat{\sigma}_{VP,j-1}) - tr(\hat{\sigma}_{VP,j})}{tr(\hat{\sigma}_{VP,j-1})} < K_{tr\_plaus}$ Cp' $\mu(\text{diag}(W)) < K_\mu$.

So in the latter case, if at least one of the three conditions Ap', Bp' and Cp' is fulfilled, the current estimation is considered to be not plausible and the previous estimation is used as a final solution. No further iteration is carried out.

A convergence check is carried out if the three conditions Ap, Bp and Cp are all fulfilled. When using the alternative conditions Ap', Bp' and Cp', they all need to be not fulfilled in order to allow for the convergence check. In the convergence check it is determined whether each of three statistical measures meets a respective threshold condition according to:

$$\left| \frac{tr(\hat{\sigma}_{VP,j-1}) - tr(\hat{\sigma}_{VP,j})}{tr(\hat{\sigma}_{VP,j-1})} \right| > K_{tr\_next}$$

-continued

An. $\hat{\sigma}_{\dot{r}} - \sigma_{\dot{r}} > K_{\sigma_{\dot{r}}}$

Bn. $j < K_{max,j}$ wherein
j represents the iteration index,
$K_{\sigma_{\dot{r}}}$ represents a threshold,
$K_{max,j}$ represents a threshold,
$K_{tr\_next}$ represents a threshold.

If all three conditions An, Bn and Cn are fulfilled, i.e., the inequalities are all true, the current estimation is considered to be not close enough to a desired optimum solution and a further iteration of the IRLS methodology is carried out under the assumption that this would deliver an estimation which is closer to the optimum solution. If at least one of the three conditions An, Bn and Cn is not fulfilled, the current estimation is considered to be close enough to a desired optimum (i.e., converging) and the current estimation is used as a final solution. It is understood that the conditions An, Bn and Cn can simply be changed to its respective opposites, that is $$An' \left| \frac{tr(\hat{\sigma}_{VP,j-1}) - tr(\hat{\sigma}_{VP,j})}{tr(\hat{\sigma}_{VP,j-1})} \right| < K_{tr\_next}$$

$$Bn' \; \hat{\sigma}_{\dot{r}} - \sigma_{\dot{r}} < K_{\sigma_{\dot{r}}}$$

$$Cn' \; j > K_{max,j}.$$

So, if at least one of the three conditions An', Bn' and Cn' is fulfilled, the current estimation is considered to be close enough to a desired optimum (i.e., converging) and the current estimation is used as a final solution. No further iteration is carried out.

It is understood that the combination of the conditions is exemplary and the invention is not limited to this combination and other combinations are also possible to achieve the desired effect, namely to reduce the computational complexity and at the same time to improve the validity of the estimation. Therefore, the estimation determined by one of the embodiments described herein also improves the reliability of automated and autonomous driving applications.

Figure 6:
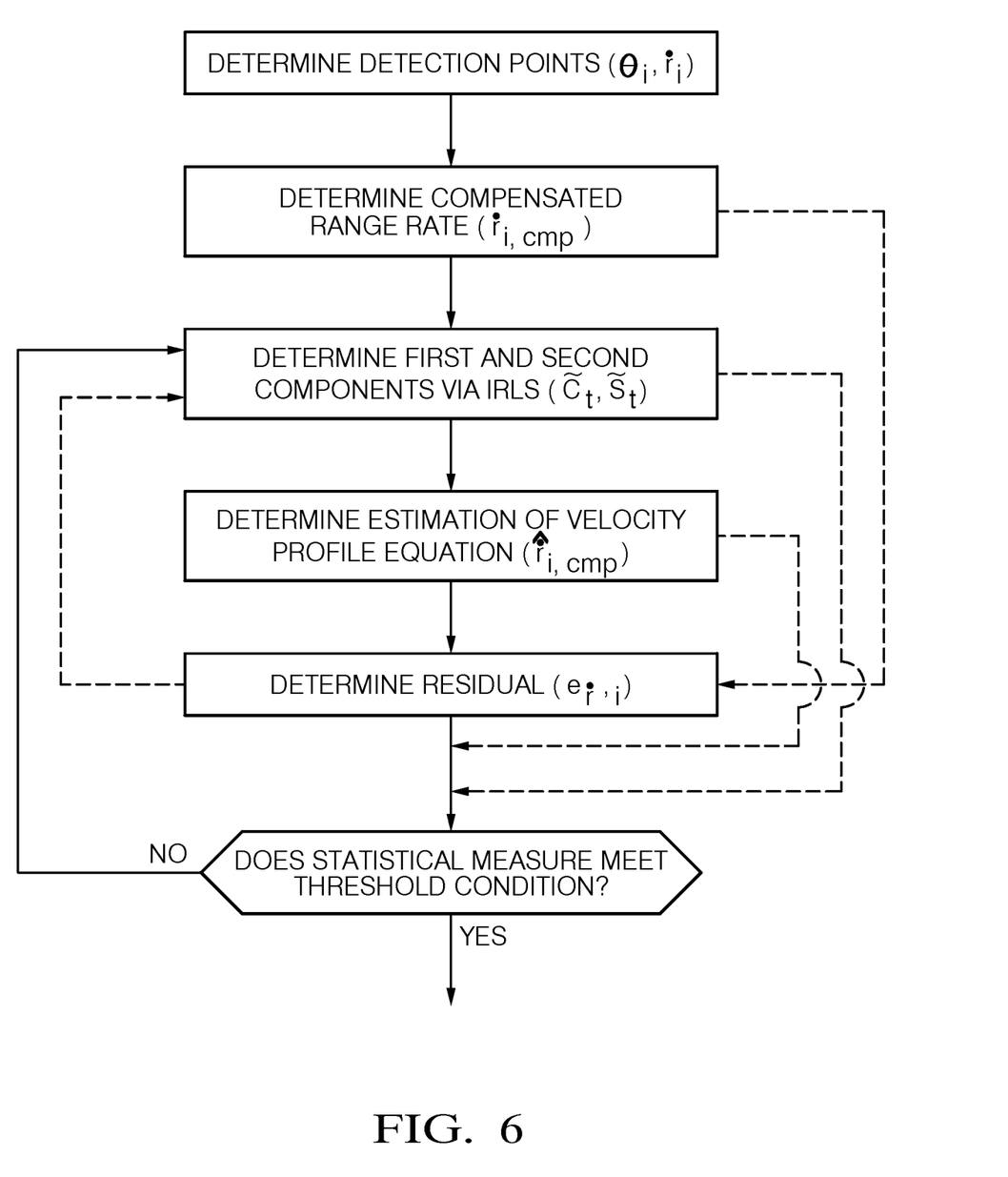
FIG. 6 illustrates an embodiment of the method as described herein.

FIG. 6 gives a general overview of an embodiment of the method. Broken lines indicate optional flow of information which depends on the statistical measures used in the undermost block. This block can comprise conditions An', Bn', Cn', Ap', Bp', and Cp', wherein if at least one of these conditions is met no further iteration is carried out, this is that the method proceeds with "yes".

Figure 7:
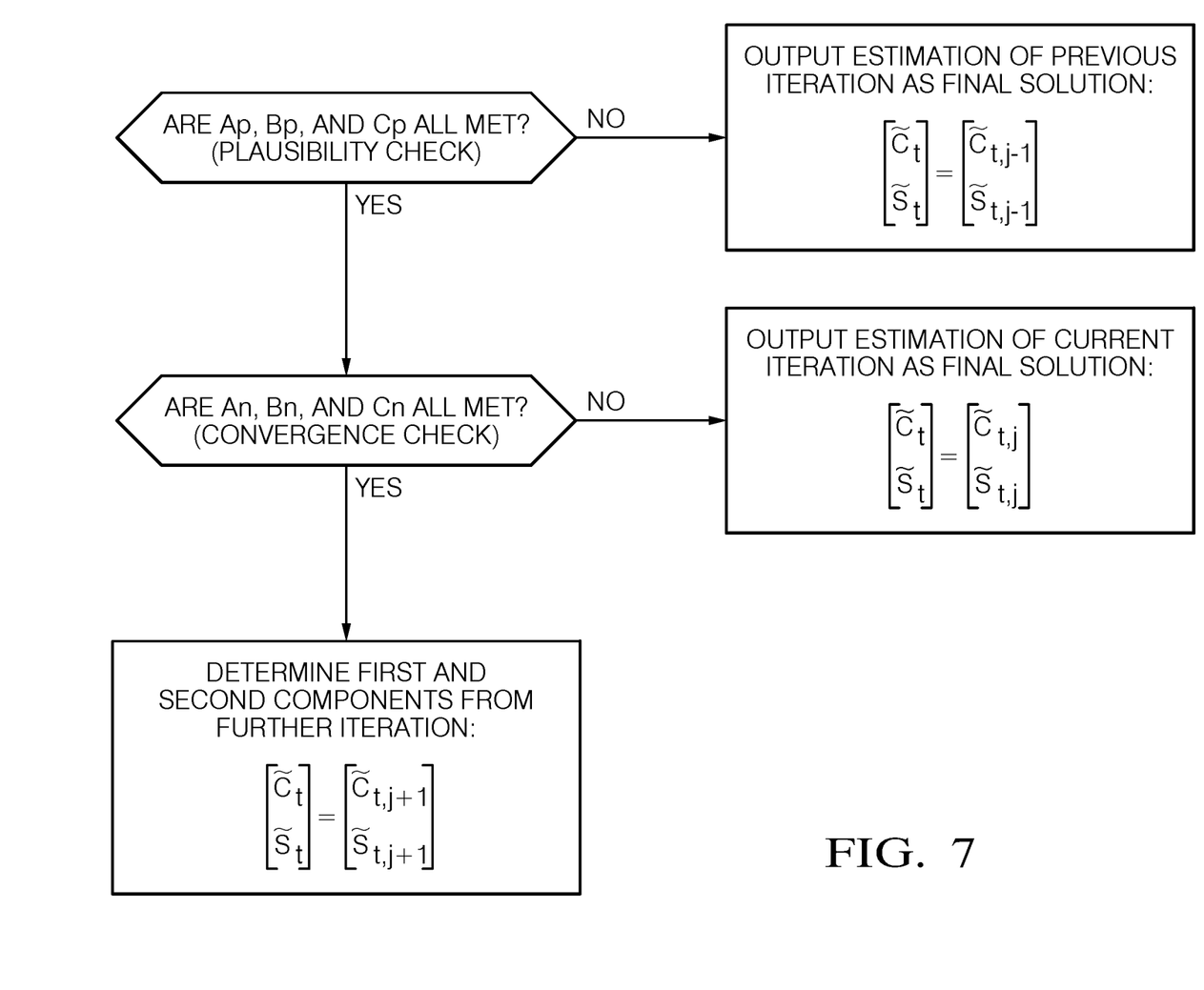
FIG. 7 illustrates an embodiment of the method with regard to controlling the number of iterations.

FIG. 7 shows an alternative for the undermost block of FIG. 6 in line with the plausibility check and convergence check described above. As is understood from FIG. 7, a further iteration ("j+1") is only carried out when all conditions Ap, Bp, Cp, An, Bn, and Cn are met. The variable j is the iteration index. It is to be noted that carrying out a further iteration corresponds to proceeding with the "yes" branch, which corresponds to the "no" branch from the undermost block of FIG. 6. This is due to the different formulation of the conditions. In FIG. 7, the convergence check is subject to a negative formulation, i.e. the "yes" and "no" branches answer the question whether the current solution is not converging ("further iteration needed?").

Turning again to FIG. 7, if no further iteration is carried out (i.e. at least one of Ap, Bp, Cp, An, Bn, and Cn is not met) either (i) the estimation of the first and second components of the previous iteration is used as a final solution of the first and second components of the velocity profile equation ("j−1"), or (ii) the estimation from the current iteration is used as a final solution ("j"). Case (i) is reached if at least one of Ap, Bp, Cp is not met. Case (ii) is reached if at least one of An, Bn, and Cn is not met.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

LIST OF REFERENCE SIGNS 1 origin of world coordinate system
2, 2' target vehicle
3 front bumper
3' rear bumper
3" origin of vehicle coordinate system
4 host vehicle
5 origin of sensor coordinate system
5' radar system
6, 6' detection point
7 center of rotation of the target

We claim:
1. A method comprising:
estimating a velocity of a target in a horizontal plane using a host vehicle equipped with a radar system, the radar system including a radar sensor unit adapted to receive signals emitted from the host vehicle and reflected by the target in one measurement time instance, the estimating of the velocity of the target in a horizontal plane comprising:

a) emitting a radar signal and determining, from a plurality of radar detection measurements captured by the radar sensor unit over a plurality of ranges and a plurality of azimuth angles, a plurality of radar detection points, each radar detection point comprising an azimuth angle $\theta_i$ and a range rate $\dot{r}_i$, wherein the range rate $\dot{r}_i$ represents the rate of change of the distance between the radar sensor unit and the target;

b) determining a compensated range rate $\dot{r}_{i,cmp}$ represented by:

$$\dot{r}_{i,cmp} = \dot{r}_i + u_s \cos\theta_i + v_s \sin\theta_i,$$

wherein $u_s$ represents a longitudinal velocity component of the radar sensor unit and wherein $v_s$ represents a lateral velocity component of the radar sensor unit;

c) determining, from the results of step a) and b), an estimation $\tilde{c}_t$ of a first component $c_t$ of a velocity profile equation of the target and an estimation $\tilde{s}_t$ of a second component $s_t$ of the velocity profile equation by using an iteratively reweighted least squares methodology comprising multiple iterations and applying weights $w_i$ to the radar detection points, wherein the velocity profile equation is represented by:

$$\dot{r}_{i,cmp} = c_t \cos\theta_i + s_t \sin\theta_i;$$

d) determining an estimation $\hat{\dot{r}}_{i,cmp}$ of the velocity profile equation represented by:

$$\hat{\dot{r}}_{i,cmp} = \tilde{c}_t \cos\theta_i + \tilde{s}_t \sin\theta_i,$$

wherein the azimuth angle $\theta_i$ is determined from step a) and the estimations $\tilde{c}_t$ and $\tilde{s}_t$ of the first and second components $c_t$ and $s_t$ of the velocity profile equation are determined from step c);

e) determining a residual $e_{\dot{r},i}$ of the estimation $\hat{\dot{r}}_{i,cmp}$ of the velocity profile equation determined from step d) and the compensated range rate $\dot{r}_{i,cmp}$ determined from step b), wherein the residual $e_{\dot{r},i}$ is represented by a difference of the compensated range rate $\dot{r}_{i,cmp}$ and the estimation $\hat{\dot{r}}_{i,cmp}$ of the velocity profile equation, and further determining the weights $w_i$ with respect to the residual $e_{\dot{r},i}$;

f) determining an estimation of the velocity of the target on the basis of the estimations $\tilde{c}_t$ and $\tilde{s}_t$ of the first and second components $c_t$ and $s_t$ of the velocity profile equation determined from step c); and wherein, in step c), the estimations $\tilde{c}_t$ and $\tilde{s}_t$ of the first and second components $c_t$ and $s_t$ of the velocity profile equation are not determined from at least one iteration of the multiple iterations of the iteratively reweighted least squares methodology if at least one statistical measure representing:

a deviation of an estimated dispersion of the estimations $\tilde{c}_t$ and $\tilde{s}_t$ of the first and second components $c_t$ and $s_t$ of a current iteration from a previous iteration; or a deviation of an estimated dispersion of the residual $e_{\dot{r},i}$ from a predefined dispersion of the range rate $\dot{r}_i$;

meets a first threshold condition;

receiving, by a control unit of the host vehicle, the estimation of the velocity of the target; and:

in response to the estimation of the velocity of the target:

controlling, by the control unit and based on the estimation of the velocity of the target, the host vehicle; or outputting, by the control unit and based on the estimation of the velocity of the target meeting a second threshold condition, a warning signal.

2. The method according to claim 1, wherein, in step c), the estimations $\tilde{c}_t$ and $\tilde{s}_t$ of the first and second components $c_t$ and $s_t$ of the velocity profile equation are also not determined from at least one iteration of the multiple iterations of the iteratively reweighted least squares methodology if at least one statistical measure representing a linear dependency of the radar detection points meets a third threshold condition.

3. The method according to claim 2, wherein the statistical measure representing the linear dependency of the radar detection points is based on a determinant of $$X^T W X$$

with $$X = \begin{bmatrix} \cos\theta_1 & \sin\theta_1 \\ \vdots & \vdots \\ \cos\theta_n & \sin\theta_n \end{bmatrix}$$

and W representing the weights $w_i$ arranged in a diagonal matrix.

4. The method according to claim 1, wherein, in step c), the estimations $\tilde{c}_t$ and $\tilde{s}_t$ of the first and second components $c_t$ and $s_t$ of the velocity profile equation are also not determined from at least one iteration of the multiple iterations of the iteratively reweighted least squares methodology if at least one statistical measure representing the weights $w_i$ applied to the radar detection points meets a third threshold condition.

5. The method according to claim 4, wherein the statistical measure representing the weights $w_i$ is based on a mean of the weights $w_i$.

6. The method according to claim 1, wherein the estimated dispersion of the residual $e_{\dot{r},i}$ is represented by a square root of:

$$\hat{\sigma}_r^2 = \frac{\sum_{i=1}^n (\psi(e_{\dot{r},i}))^2}{\left(\sum_{i=1}^n \psi(e_{\dot{r},i})'\right)^2 (n-2)}$$

with $$\psi(e_{\dot{r},i}) = w_i e_{\dot{r},i},$$

wherein $\psi(e_{\dot{r},i})'$ represents a first derivative of $\psi(e_{\dot{r},i})$ with respect to the residual $e_{\dot{r},i}$, and wherein n represent a number of radar detection points.

7. The method according to claim 1, wherein the estimated dispersion of the estimations $\tilde{c}_t$ and $\tilde{s}_t$ of the first and second components $c_t$ and $s_t$ of the velocity profile equation is represented by a sum of the estimated dispersions of the estimations $\tilde{c}_t$ and $\tilde{s}_t$ of the first and second components $c_t$ and $s_t$ of the velocity profile equation.

8. The method according to claim 1, wherein the estimated dispersion of the estimations $\tilde{c}_t$ and $\tilde{s}_t$ of the first and second components $c_t$ and $s_t$ of the velocity profile equation is represented by a trace evaluated on the basis of:

$$\hat{\sigma}_{VP}^2 = \hat{\sigma}_{\bar{r}}^2 (X^T W X)^{-1} = \begin{bmatrix} \hat{\sigma}_{cc}^2 & \hat{\sigma}_{cs}^2 \\ \hat{\sigma}_{sc}^2 & \hat{\sigma}_{ss}^2 \end{bmatrix}$$

with $$X = \begin{bmatrix} \cos\theta_1 & \sin\theta_1 \\ \vdots & \vdots \\ \cos\theta_n & \sin\theta_n \end{bmatrix}$$

W representing the weights $w_i$ arranged in a diagonal matrix, and $\hat{\sigma}_{cc}^2, \hat{\sigma}_{ss}^2, \hat{\sigma}_{cs}^2, \hat{\sigma}_{sc}^2$ representing estimated dispersion coefficients, wherein $\hat{\sigma}_{\bar{r}}^2$ represents a square of the estimated dispersion of the residual $e_{\bar{r},i}$.

9. The method according to claim 1, wherein the predefined dispersion of the range rate $\dot{r}_i$ is given by a specification of the radar sensor unit.

10. A system comprising:

a radar sensor unit configured to estimate a velocity of a target in a horizontal plane using a host vehicle equipped with the system, the radar sensor unit adapted to receive signals emitted from the host vehicle and reflected by the target in one measurement time instance, in estimating the velocity of the target in the horizontal plane, the radar sensor unit further configured to:

emit a radar signal and determine, from a plurality of radar detection measurements captured by the radar sensor unit over a plurality of ranges and a plurality of azimuth angles, a plurality of radar detection points, each radar detection point comprising an azimuth angle $\theta_i$ and a range rate $\dot{r}_i$, wherein the range rate $\dot{r}_i$ represents the rate of change of the distance between the radar sensor unit and the target;

determine a compensated range rate $\dot{r}_{i,cmp}$ represented by:

$$\dot{r}_{i,cmp} = \dot{r}_i + u_s \cos\theta_i + v_s \sin\theta_i$$

wherein $u_s$ represents a longitudinal velocity component of the radar sensor unit and wherein $v_s$ represents a lateral velocity component of the radar sensor unit;

determine, an estimation $\tilde{c}_t$ of a first component $c_t$ of a velocity profile equation of the target and an estimation $\tilde{s}_t$ of a second component $s_t$ of the velocity profile equation by using an iteratively reweighted least squares methodology comprising multiple iterations and apply weights $w_i$ to the radar detection points, wherein the velocity profile equation is represented by:

$$\dot{r}_{i,cmp} = c_t \cos\theta_i + s_t \sin\theta_i;$$

determine an estimation $\hat{\dot{r}}_{i,cmp}$ of the velocity profile equation represented by:

$$\hat{\dot{r}}_{i,cmp} = \tilde{c}_t \cos\theta_i + \tilde{s}_t \sin\theta_i,$$

determine a residual $e_{\bar{r},i}$ of the estimation $\hat{\dot{r}}_{i,cmp}$ of the velocity profile equation and the compensated range rate $\dot{r}_{i,cmp}$, wherein the residual $e_{\bar{r},i}$ is represented by a difference of the compensated range rate $\dot{r}_{i,cmp}$ and the estimation $\hat{\dot{r}}_{i,cmp}$ of the velocity profile equation, and further determining the weights $w_i$ with respect to the residual $e_{\bar{r},i}$;

determine an estimation of the velocity of the target on the basis of the estimations $\tilde{c}_t$ and $\tilde{s}_t$ of the first and second components $c_t$ and $s_t$ of the velocity profile equation; and wherein the estimations $\tilde{c}_t$ and $\tilde{s}_t$ of the first and second components $c_t$ and $s_t$ of the velocity profile equation are not determined from at least one iteration of the multiple iterations of the iteratively reweighted least squares methodology if at least one statistical measure representing:

a deviation of an estimated dispersion of the estimations $\tilde{c}_t$ and $\tilde{s}_t$ of the first and second components $c_t$ and $s_t$ of a current iteration from a previous iteration; or a deviation of an estimated dispersion of the residual $e_{\bar{r},i}$ from a predefined dispersion of the range rate $\dot{r}_i$;

meets a threshold condition; and a control unit configured to receive the estimation of the velocity of the target and, in response to the estimation of the velocity of the target:

control, based on the estimation of the velocity of the target, the host vehicle; or output, based on the estimation of the velocity of the target meeting a second threshold condition, a warning signal.

11. The system according to claim 10, wherein the estimations $\tilde{c}_t$ and $\tilde{s}_t$ of the first and second components $c_t$ and $s_t$ of the velocity profile equation are also not determined from at least one iteration of the multiple iterations of the iteratively reweighted least squares methodology if at least one statistical measure representing a linear dependency of the radar detection points meets a third threshold condition.

12. The system according to claim 11, wherein the statistical measure representing the linear dependency of the radar detection points is based on a determinant of $$X^T W X$$

with $$X = \begin{bmatrix} \cos\theta_1 & \sin\theta_1 \\ \vdots & \vdots \\ \cos\theta_n & \sin\theta_n \end{bmatrix}$$

and W representing the weights $w_i$ arranged in a diagonal matrix.

13. The system according to claim 10, wherein the estimations $\tilde{c}_t$ and $\tilde{s}_t$ of the first and second components $c_t$ and $s_t$ of the velocity profile equation are also not determined from at least one iteration of the multiple iterations of the iteratively reweighted least squares methodology if at least one statistical measure representing the weights $w_i$ applied to the radar detection points meets a third threshold condition.

14. The system according to claim 13, wherein the statistical measure representing the weights $w_i$ is based on a mean of the weights $w_i$.

15. The system according to claim 10, wherein the estimated dispersion of the residual $e_{\bar{r},i}$ is represented by a square root of:

$$\hat{\sigma}_{\bar{r}}^2 = \frac{\sum_{i=1}^{n}(\psi(e_{\bar{r},i}))^2}{\left(\sum_{i=1}^{n}\psi(e_{\bar{r},i})'\right)^2 (n-2)}$$

-continued with $$\psi(e_{\dot{r},i}) = w_i e_{\dot{r},i}$$

wherein $\psi(e_{\dot{r},i})'$ represents the first derivative of $\psi(e_{\dot{r},i})$ with respect to the residual $e_{\dot{r},i}$, and wherein n represent a number of radar detection points.

16. The system according to claim 10, wherein the estimated dispersion of the estimations $\tilde{c}_t$ and $\tilde{s}_t$ of the first and second components $c_t$ and $s_t$ of the velocity profile equation is represented by a sum of the estimated dispersions of the estimations $\tilde{c}_t$ and $\tilde{s}_t$ of the first and second components $c_t$ and $s_t$ of the velocity profile equation.

17. The system according to claim 10, wherein the estimated dispersion of the estimations $\tilde{c}_t$ and $\tilde{s}_t$ of the first and second components $c_t$ and $s_t$ of the velocity profile equation is represented by a trace evaluated on the basis of:

$$\hat{\sigma}_{VP}^2 = \hat{\sigma}_{\dot{r}}^2 (X^T W X)^{-1} = \begin{bmatrix} \hat{\sigma}_{cc}^2 & \hat{\sigma}_{cs}^2 \\ \hat{\sigma}_{sc}^2 & \hat{\sigma}_{ss}^2 \end{bmatrix}$$

with $$X = \begin{bmatrix} \cos\theta_1 & \sin\theta_1 \\ \vdots & \vdots \\ \cos\theta_n & \sin\theta_n \end{bmatrix}$$

W representing the weights $w_i$ arranged in a diagonal matrix, and $\hat{\sigma}_{cc}^2$, $\hat{\sigma}_{ss}^2$, $\hat{\sigma}_{cs}^2$, $\hat{\sigma}_{sc}^2$ representing estimated dispersion coefficients, wherein $\hat{\sigma}_{\dot{r}}^2$ represents a square of the estimated dispersion of the residual $e_{\dot{r},i}$.

18. The system according to claim 10, wherein the predefined dispersion of the range rate $\dot{r}_i$ is given by a specification of the radar sensor unit.

* * * * *